United States Patent
Dahlgren et al.

[11] Patent Number: 6,143,058
[45] Date of Patent: *Nov. 7, 2000

[54] ADSORBENT CONSTRUCTION AND METHOD

[75] Inventors: Andrew Christian Dahlgren, Golden Valley; Robert Murray Rogers, Minnetonka, both of Minn.

[73] Assignee: Donaldson Company, Inc., Minneapolis, Minn.

[ * ] Notice: This patent is subject to a terminal disclaimer.

[21] Appl. No.: 09/208,536

[22] Filed: Dec. 9, 1998

Related U.S. Application Data

[63] Continuation of application No. 08/819,851, Mar. 17, 1997, Pat. No. 5,876,487.

[51] Int. Cl.$^7$ .................................................. B01D 53/04
[52] U.S. Cl. .................. 96/13; 96/135; 96/153; 96/154; 55/385.1; 55/385.6
[58] Field of Search ................. 55/385.1, 385.6; 96/13, 135, 153, 154

[56] References Cited

U.S. PATENT DOCUMENTS

| | | |
|---|---|---|
| 3,820,309 | 6/1974 | Cullen et al. . |
| 3,918,578 | 11/1975 | Cullen et al. . |
| 3,953,566 | 4/1976 | Gore . |
| 4,110,392 | 8/1978 | Yamazaki . |
| 4,181,513 | 1/1980 | Fukuda et al. . |
| 4,187,390 | 2/1980 | Gore . |
| 4,194,225 | 3/1980 | Hasler . |
| 4,217,386 | 8/1980 | Arons et al. . |
| 4,250,172 | 2/1981 | Mutzenberg et al. . |
| 4,272,264 | 6/1981 | Cullen et al. . |
| 4,308,041 | 12/1981 | Ellis et al. . |
| 4,418,369 | 11/1983 | Applequist et al. . |
| 4,453,955 | 6/1984 | Cullen et al. . |
| 4,471,395 | 9/1984 | Beck et al. . |
| 4,489,356 | 12/1984 | Farmer . |
| 4,581,668 | 4/1986 | Campbell . |
| 4,594,626 | 6/1986 | Frangesh . |
| 4,600,420 | 7/1986 | Wydeven et al. . |
| 4,633,349 | 12/1986 | Beck et al. . |
| 4,636,891 | 1/1987 | Barski . |
| 4,642,715 | 2/1987 | Ende . |
| 4,657,570 | 4/1987 | Gronholz et al. . |
| 4,684,510 | 8/1987 | Harkins . |
| 4,725,904 | 2/1988 | Dalziel . |
| 4,748,069 | 5/1988 | Cullen . |
| 4,751,594 | 6/1988 | Blanks . |
| 4,772,300 | 9/1988 | Cullen et al. . |
| 4,777,549 | 10/1988 | Dushkes et al. . |

(List continued on next page.)

FOREIGN PATENT DOCUMENTS

| | | |
|---|---|---|
| 0 427 490 A2 | 5/1991 | European Pat. Off. . |
| 0 458 528 A1 | 11/1991 | European Pat. Off. . |
| 39 15350 A1 | 11/1990 | Germany . |
| WO 96/06669 | 3/1996 | WIPO . |
| WO 96/14136 | 5/1996 | WIPO . |
| WO 97/00717 | 1/1997 | WIPO . |
| WO 97/37756 | 10/1997 | WIPO . |

*Primary Examiner*—David A. Simmons
*Assistant Examiner*—Minh-Chau T. Pham
*Attorney, Agent, or Firm*—Merchant & Gould P.C.

[57] ABSTRACT

An adsorbent filter including compression molded particulate adsorbent construction is provided. The compression molded particulate adsorbent construction contains a particulate adsorbent and a sufficient amount of binder to retain the particulate adsorbent in a non-free flowing form. The adsorbent filter preferably includes a compression molded particulate adsorbent construction as described, positioned within an outer, porous cover. Preferably the outer, porous cover includes expanded porous polytetrafluoroethylene. In certain preferred applications, the adsorbent filter is positioned within a housing defining an internal volume and including therein electronic component(s), such that the adsorbent filter protects the internal volume of the housing, and components therein, from damage. The typical application is as a disk drive adsorbent filter. A preferred method for preparing an adsorbent filter according to the present invention is provided.

31 Claims, 6 Drawing Sheets

U.S. PATENT DOCUMENTS

| | | |
|---|---|---|
| 4,813,791 | 3/1989 | Cullen et al. . |
| 4,816,328 | 3/1989 | Saville et al. . |
| 4,830,643 | 5/1989 | Sassa et al. . |
| 4,857,087 | 8/1989 | Bolton et al. . |
| 4,863,499 | 9/1989 | Osendorf . |
| 4,877,433 | 10/1989 | Oshitari . |
| 4,880,448 | 11/1989 | Scherrer . |
| 4,885,652 | 12/1989 | Leonard et al. . |
| 4,889,542 | 12/1989 | Hayes . |
| 4,911,739 | 3/1990 | Cullen et al. . |
| 4,947,957 | 8/1990 | Cullen et al. . |
| 4,988,903 | 1/1991 | Koriyama . |
| 4,992,410 | 2/1991 | Cullen et al. . |
| 5,005,763 | 4/1991 | Cullen et al. . |
| 5,009,308 | 4/1991 | Cullen et al. . |
| 5,025,336 | 6/1991 | Morehouse et al. . |
| 5,029,026 | 7/1991 | Stefansky et al. . |
| 5,030,260 | 7/1991 | Beck et al. . |
| 5,034,835 | 7/1991 | Yokoyama . |
| 5,069,694 | 12/1991 | Cullen et al. . |
| 5,075,807 | 12/1991 | Inoue et al. . |
| 5,081,551 | 1/1992 | Aruga . |
| 5,092,914 | 3/1992 | Cullen et al. . |
| 5,148,337 | 9/1992 | Cullen et al. . |
| 5,191,721 | 3/1993 | Incorvia et al. . |
| 5,207,943 | 5/1993 | Cullen et al. . |
| 5,262,375 | 11/1993 | McKedy . |
| 5,308,703 | 5/1994 | Tsujimoto et al. . |
| 5,322,701 | 6/1994 | Cullen et al. . |
| 5,406,431 | 4/1995 | Beecroft . |
| 5,417,743 | 5/1995 | Dauber . |
| 5,443,626 | 8/1995 | Kiyani . |
| 5,500,038 | 3/1996 | Dauber et al. . |
| 5,503,662 | 4/1996 | Berger . |
| 5,538,545 | 7/1996 | Dauber et al. . |
| 5,593,482 | 1/1997 | Dauber et al. . |
| 5,876,487 | 3/1999 | Dahlgren et al. ............... 55/385.6 |

ADSORBENT CONSTRUCTION AND METHOD

This application is a Continuation of application Ser. No. 08/819,851, filed Mar. 17, 1997, now U.S. Pat. No. 5,876,487 which application(s) are incorporated herein by reference.

FIELD OF THE INVENTION

The present invention relates to adsorbents. It particularly concerns provision of adsorbent filters that can be used in a variety of environments. The adsorbent filters are particularly well adapted for utilization in electronic equipment, for example in computer disk drives which are sensitive to humidity, organic vapors and/or acid gas.

BACKGROUND OF THE INVENTION

Adsorbent filters are widely utilized in such industries as the electronics industry and the pharmaceuticals industry. For example, in the computer industry, adsorbent filters are positioned within disk drives, to protect the disk drives from water vapor hydrocarbons and/or acid gases. Without such protection, these vapors can lead to stiction, corrosion and, ultimately, drive failure.

In general, adsorbent filters comprise a porous construction having positioned therein adsorbent. Arrangements presently widely used comprise granular or powdered adsorbent, for example desiccant and/or carbon adsorbent, enclosed within a pouch. Such an arrangement is described, for example, in U.S. Pat. No. 4,830,643 to W. L. Gore & Associates, Inc. The arrangements described in the '643 patent comprise a tubular container of porous polytetrafluoroethylene sealed at each end so as to enclose adsorbent particles. Among the materials described in the '643 patent as the adsorbent particles, are silica gel (SG), activated carbon, calcium sulfate, calcium carbonate, activated alumina and molecular sieve adsorbent.

Alternate constructions to those described in the. '643 patent have been available from Donaldson Company, Inc. of Bloomington, Minn., the assignee of the present invention. The Donaldson constructions generally comprise a pouch comprising two sheets of polytetrafluoroethylene membrane, sealed to one another along a border or perimeter seal. Enclosed within the pouch is the particulate adsorbent material. In some constructions, a second pouch is enclosed within the first pouch, and the second pouch contains the adsorbent material. In either case, in the past in such constructions, the adsorbent material has typically comprised a loose, granular, flowable, solid material.

SUMMARY OF THE INVENTION

According to the present invention, an adsorbent filter construction is provided. The adsorbent filter construction generally comprises a compression molded particulate adsorbent construction contained within the inner volume of an outer porous cover. The compression molded particulate adsorbent construction generally comprises a mixture of particulate adsorbent and binder. A sufficient amount of binder is provided to keep the particulate adsorbent in a non-free flowing form. That is, the binder will retain the otherwise free-flowing granular or powdered adsorbent in a predetermined, rigid, shape. Thus, the compression molded particulate adsorbent construction comprises a brick, wafer or tablet which retains its form under normal handling and use conditions.

A preferred cover comprises expanded, porous, polytetrafluoroethylene. In certain preferred embodiments, the cover comprises polytetrafluoroethylene which has been laminated to a sufficient amount of thermoplastic polymer scrim, in an appropriate form or pattern, to allow for ultrasonic welding or heat sealing. Typically a polyolefin scrim, such as a spun bond polypropylene scrim, will be used to accomplish this.

The preferred compression molded particulate adsorbent construction comprises a mixture of particulate adsorbent (preferably powdered, i.e., which goes through 100 mesh; or, if granular, in a form which is preferably 28–200 mesh, United States Standard (U.S.S.)), mixed with a binder such as: polyvinyl alcohol (PVA); starch; carboxy methyl cellulose (CBC); polyvinylpyrolidone (PVP); microcrystalline cellulose (MCC); dicalcium phosphate dihydrate; or a mixture thereof.

Herein the term "U.S.S." refers to United States Standard screen, which is characterized by the number of wires per inch in the screen. For example, a 28 U.S.S. screen, comprises 28 wires per linear inch, with the wires evenly spaced. The term 28–200 mesh references material which passes through a 28 U.S.S. screen but is the fraction that does not pass through a 200 mesh U.S.S. screen. Thus, the term identifies a maximum and minimum particle size within the identified material. It is noted that the characterization is not intended to be absolute; for example, some particles may break or form powder and others may agglomerate to form larger sizes, before or after the screening. Rather, the term is meant to refer to its general use in the trade, which is merely to the screen fraction(s) selected for the composition. In general, it will be found that a definition of material by screen size is generally indicative of screen size for a great majority of the particles, both by number and weight.

When the particulate adsorbent used is a powder, preferably it is a particulate material which passes through 100 mesh. Most preferably, it is a fraction which predominantly comprises particles having a nominal (average) size greater than 7 microns. This is in part because when the nominal size of the particles is 7 microns or less, flow of the material through tabletting machines may be a problem. If the size is greater than 28 mesh, getting effective binding may be a problem.

The adsorbent material, as explained in further detail below, can be a wide variety of materials. For a majority of typical applications, it is perceived that the adsorbent material will be: desiccant (for water vapor adsorption); a form of activated carbon (for organic vapor adsorption or acid gas adsorption); or, a mixture of the two. The general term "adsorbent" as used herein is not meant to refer to any particular material or material for adsorption of any particular contaminant. More generally, the adsorbent may comprise: silica gel; untreated activated carbon; chemically treated activated carbon for adsorption of acid gas (typically chemical treatments being with potassium carbonate, calcium carbonate or sodium carbonate); molecular sieve; activated alumina; or, mixtures thereof. Herein the term "carbon adsorbent" or variants thereof is meant to include activated carbon and chemically treated activated carbon, unless otherwise specified.

According to the present invention, a combination is provided which comprises a housing defining a cavity or internal volume, for example including therein electronic component(s), and at least one adsorbent filter, as previously described. Typically, the volume will be the inside of a disk drive. The filter is positioned within the housing internal volume to adsorb vapors (for example moisture vapor and/or organic vapor) therein. The housing and electronic component(s) may comprise, for example, a computer disk drive.

Herein the terms "adsorbent" and "adsorb" are not intended to be limiting with respect to the manner or mechanism of vapor entrapment. That is, the terms are intended to refer to any mechanism of entrapment whether it be adsorption, absorption or some other mechanism.

Also according to the present invention, a method of protecting an electronic component, such as a computer disk drive, from damage due to the presence of vapors therein is provided. The method generally comprises positioning within the electronic component at least one adsorbent filter as described above. Alternatively, the filter could be used in a container for pharmaceuticals.

Also according to the present invention a method of preparing an adsorbent filter is provided. The method generally comprises compression molding a composition comprising a mixture of at least particulate adsorbent (powdered or granular), or mixture of adsorbent, and binder(s). The mixture may further comprise lubricant. A preferred lubricant for such a construction would be powdered PTFE, for example as available under the trade designation Teflon® from DuPont, of Wilmington, Del.

DETAILED DESCRIPTION OF THE PREFERRED EMBODIMENTS

I. Further Comments Regarding Granular Desiccants

Adsorbent filters, especially those which are to be for use within electronic components, for example to protect: computer disk drives; cellular phones; circuit boards; VCR's; TV's; and headlight assemblies, must be relatively small in size. Generally they should occupy a volume no greater than approximately 262 cubic centimeters (cc or $cm^3$), and typical ones for disk drives, depending upon the specific system of concern, will occupy volumes of approximately 0.008–262 $cm^3$, more typically 0.26 to 18 $cm^3$.

Conventional arrangements generally comprise a pouch, formed within the size limitations defined, having enclosed therein adsorbent in a flowable powder or granular form. A widely held conventional belief has been that the high surface area provided by the flowable granular form, was necessary and desirable for effective adsorbent operation. This is described, for example, in U.S. Pat. No. 4,830,643 at col. 1, lines 25–36.

While arrangements using flowable particulate material have been widely used, they are subject to certain inherent problems. For example, it is difficult to precisely control the adsorbent quantity placed in any given pouch, when a flowable granular material is used. Also, the quantity that can fit within any given volume is generally limited by the bulk density of the granular (i.e., free flowing) adsorbent.

In addition, for typical systems, after the granular material is positioned within an outer pouch or protective construction, some portion of the pouch or protective construction must be sealed. If any of the powder or granular material is positioned where the sealing is to occur, the seal may be compromised and/or difficult to obtain. This can lead to material waste and product failure; and, in some instances, contamination of the environment in which the adsorbent filter is eventually placed, by the powdered or granular desiccant material.

In addition, manufacturing or component assembly in many instances must be conducted in a clean room environment. It would be preferred, if possible, to avoid risk of loose powder or granular materials, i.e., flowable materials, in such an environment.

II. An Embodiment

Figure 1:
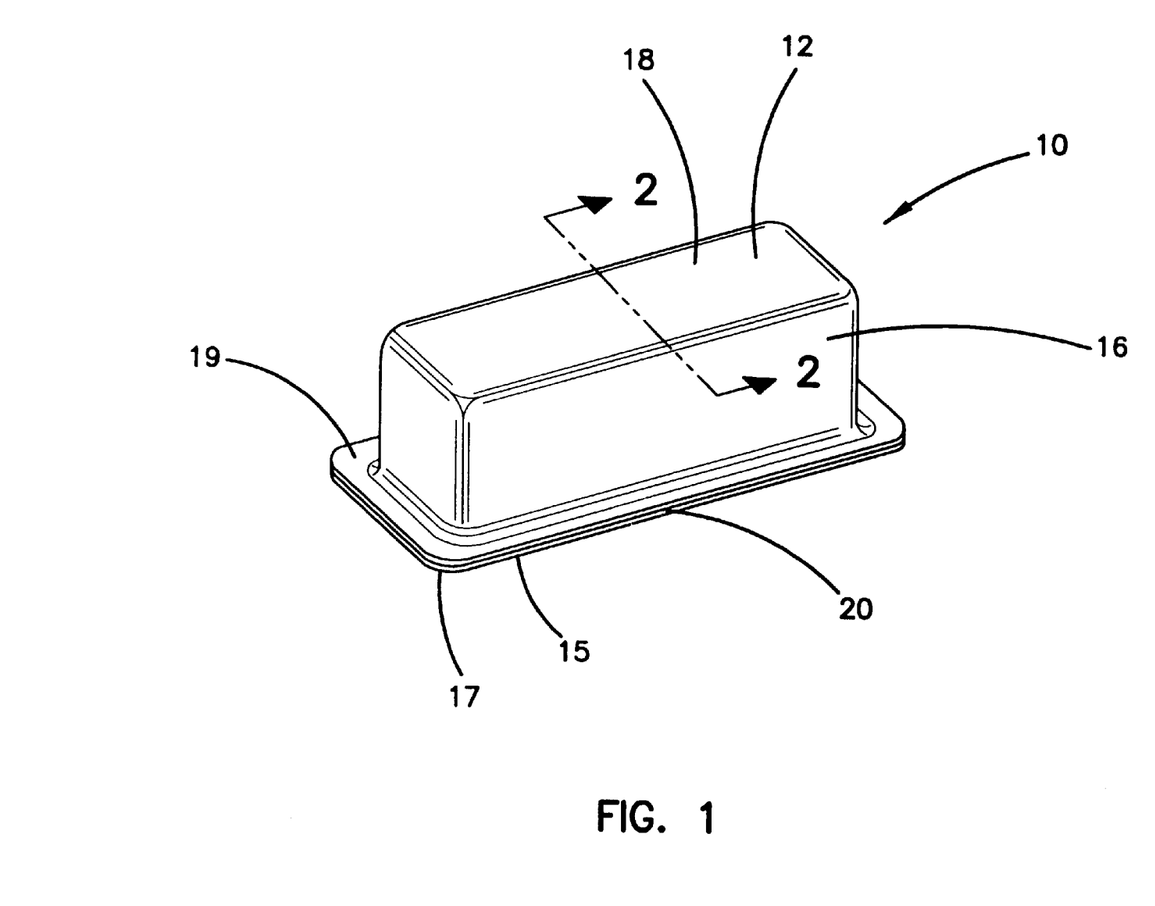
FIG. 1 is a perspective view of a filter construction according to the present invention.
Figure 2:
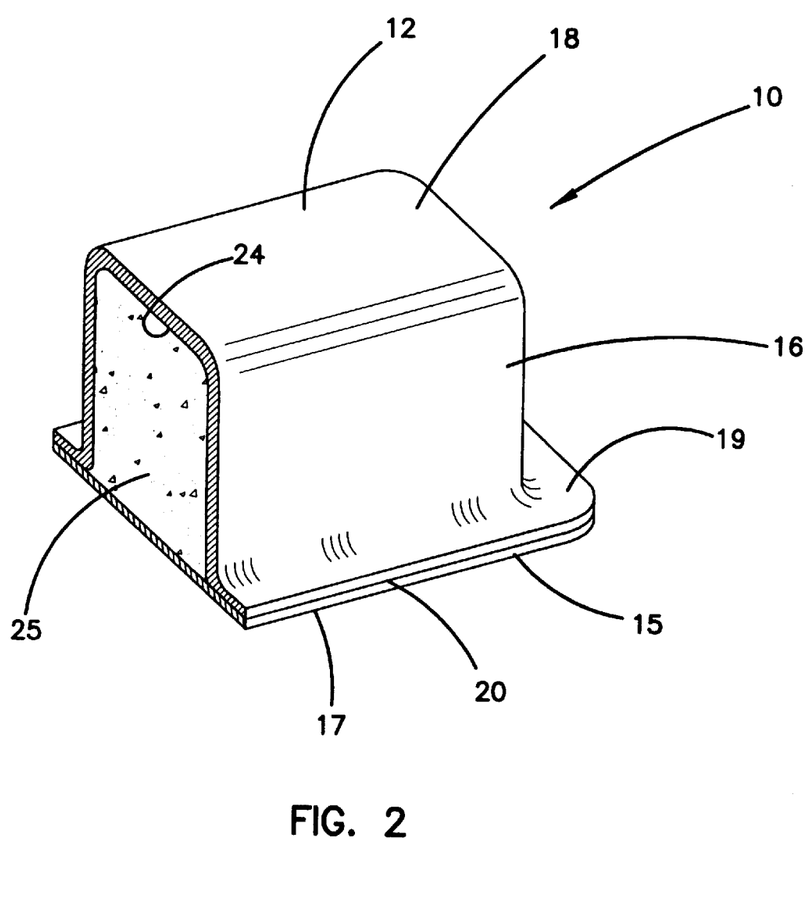
FIG. 2 is a cross-sectional view taken along line 2—2, FIG. 1.
Figure 3:
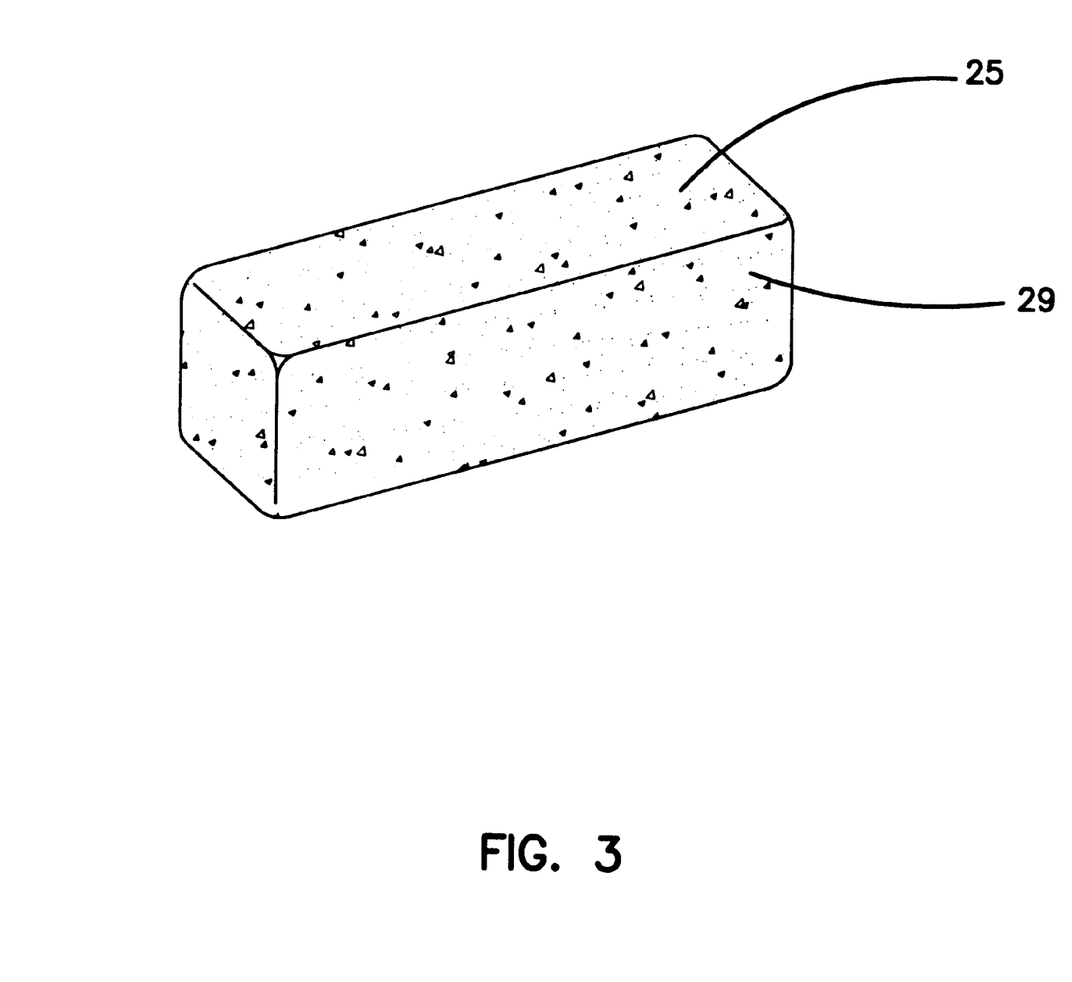
FIG. 3 is a perspective view of an internal component of the construction shown in FIG. 1.
Figure 4:
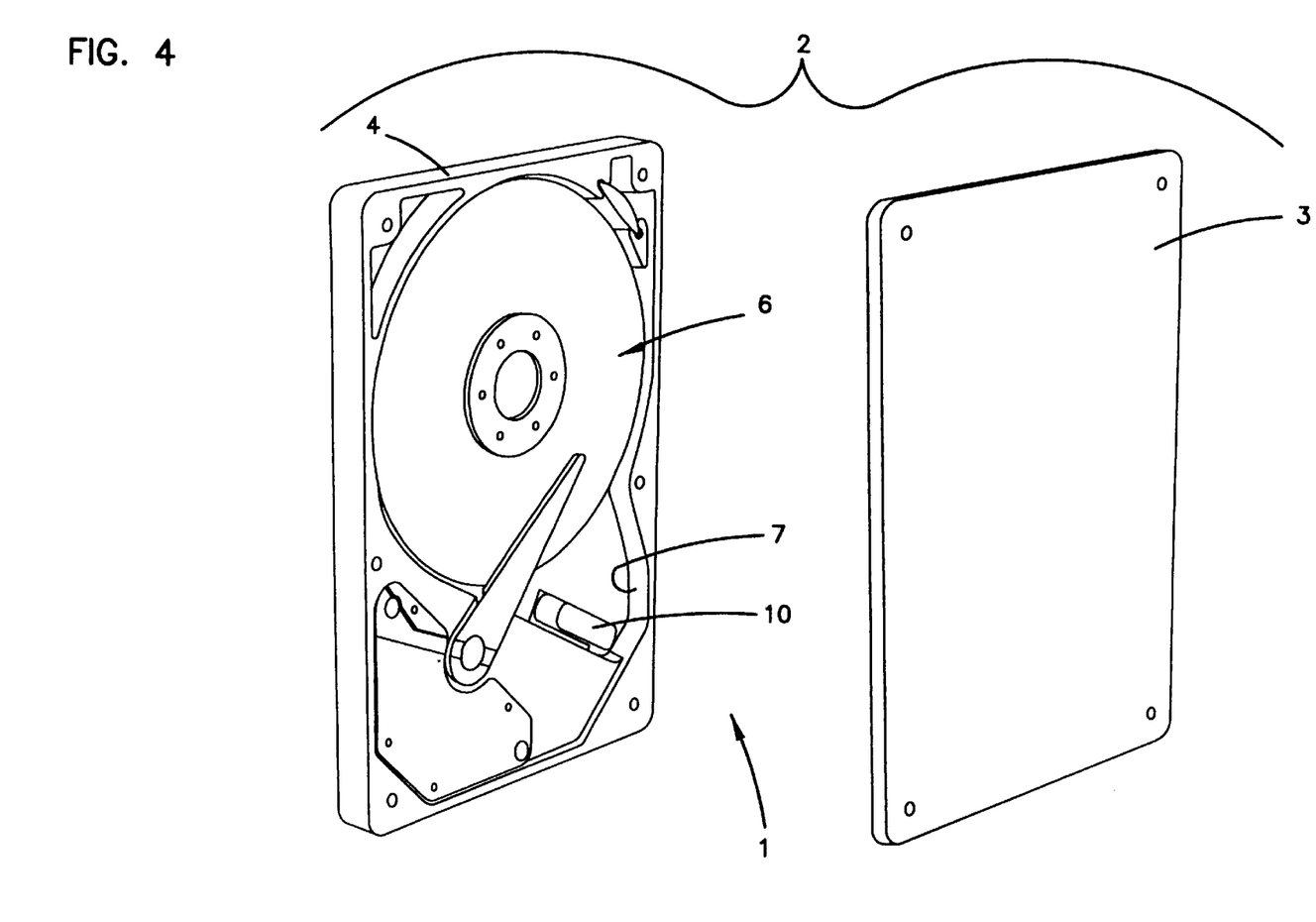
FIG. 4 is an exploded perspective view of an environment of use for the filter construction depicted in FIG. 1.

Attention is now directed to FIGS. 1–3, which show a first embodiment of an adsorbent filter according to the present invention; and, FIG. 4, which shows a combination or embodiment of use.

Referring first to FIG. 4, an enclosed volume for use, in particular a computer disk drive 1, is depicted. The disk drive 1 of FIG. 4 is depicted in exploded view, and shows a housing 2 comprising cover 3 and base 4. In base 4, typically comprising a casting such as an E-coated aluminum casting, is positioned the disk drive components 6 (hardware or electronic componentry). Within volume 7, defined by base 4 and cover 3 when assembled, it is necessary and/or desirable to provide for vapor control during equipment use and temperature cycling. This vapor control is provided by filter construction 10, for example including desiccant (for moisture vapor control) and/or activated carbon for organic vapor control or acid gas control, as described. Of course alternate or additional adsorbents can be used.

In some instances, the base or casting of a computer disk drive is formed with a receiving space or slot therein, in which the filter construction 10 is loosely positioned, during assembly. The side walls and cover associated with the slot would tend to retain the filter construction 10 in place, as desired, through product use. In some alternate arrangements, an adhesive is positioned on a flat surface of the filter construction 10, and the construction 10 is secured in place thereby. When such is the case, generally a low outgassing, permanent, acrylic, pressure sensitive adhesive (PSA) is used. Usable adhesives are those available from 3M Company of St. Paul, Minn. under the designation 467MS.

As a third alternative, in some instances a plastic housing or frame which can be secured within the casting or base 4, and which is sized to loosely receive the filter construction 10 therein, is used.

In general, as the three alternatives described above indicate, all that is required is an appropriate arrangement to retain the filter construction 10 from interfering with operation of the electronic componentry 6, in use. Arrangements which allow relatively free air flow movement into, and through, the filter construction 10, by diffusion, are generally preferred.

Attention is now directed to FIGS. 1–3, in which filter construction 10 is depicted in detail. In FIG. 1, filter construction 10 is shown in perspective. FIG. 2 depicts the construction 10 in cross-section. In FIG. 3, an internal component of construction 10 is depicted.

Referring to FIG. 1, filter construction 10 includes an outer cover, casing, pouch or shell 12. Preferably the outer cover, casing, pouch or shell 12 is formed from a stable, porous material. As a result, vapors to be adsorbed can pass therethrough, via diffusion.

Preferred materials and porosities for the cover 12 are provided hereinbelow, in a detailed description of preferred components. In general what is necessary and desirable is an appropriate porosity for passage therethrough (via diffusion) of vaporous materials, for example, water vapor, organic vapors, acid gas, etc., the presence of which is/are to be controlled by the adsorbent material positioned within the pouch. In preferred arrangements such as the one depicted, except perhaps along a perimeter seal region, discussed below, the outer casing pouch or shell 12 is porous throughout its surface area.

Still referring to FIG. 1, the particular cover or casing 12 depicted comprises two shell pieces 15, 16, secured to one another along a perimeter seal. Shell piece 15 is flat, and forms a cover 17. Shell piece 16 is formed in a bowl or receptacle shape 18, with an outer flange 19. Shell piece 15 is secured to the outer flange 19 of shell piece 16, by perimeter seal 20. As a result, the adsorbent material is encapsulated by the cover 12. Preferred methods of forming the perimeter seal 20 are described below. Herein, the material from which the cover 12 is formed may sometimes be referred to as the encapsulating material, with the cover sometimes referred to as the encapsulating construction.

In general, shell piece 15 and shell piece 16 define an interior pouch or volume 24, FIG. 2, in which is received adsorbent construction 25. The adsorbent construction 25 is not provided in the form of flowable powder or particulate. Rather, adsorbent construction 25 comprises previously flowable particulate (powder or granules) which has been secured into a tablet, wafer or brick form. Preferred methods and formulations for accomplishing this are described below. In FIG. 3, adsorbent construction 25, comprising tablet, wafer or brick 29 is depicted. The construction 25 will retain its form, shape or integrity during normal handling.

Construction in the arrangement shown in FIGS. 1–3 would proceed as follows. Tablet or brick 29 would be formed from flowable particulate material, for example granular desiccant (moisture control) and/or activated carbon or treated activated carbon (organic vapor control and/or acid gas control), by procedures such as those described below. In general, granular or powdered (i.e., particulate) adsorbent material would be mixed with an appropriate amount of binder and then be compression molded, to form the brick (tablet or wafer) 29. If desired, additional material could be provided in the mixture, before compression molding, to provide for some organic vapor adsorption (and control) by construction 10.

Preferably, powdered or granular (particulate) binder is used. In some instances, it may be desirable to mix the binder and adsorbent under conditions in which the binder is moist, so that the moisture will operate as a temporary binder to help secure the binder material to the adsorbent particles. This is described hereinbelow, when a preferred process for production is described.

Shell piece 16 can be formed from an appropriate material such as described below.

In general, the cavity or volume in shell piece 16, which receives the brick, can be formed simultaneously with the positioning of the brick (tablet or wafer) 29 therein. In general, a sheet of the material from which shell piece 16 is formed would be positioned over an appropriately sized mold or cavity. The brick (wafer or tablet) 29 would then be pressed into the sheet of shell piece material, and into the cavity, with the sheet positioned between the brick and the mold cavity. This will mold the shell piece 16 with the cavity therein, at the same time the brick (tablet or wafer) 29 is put therein. In general, with the preferred materials selected below, such an operation can be readily achieved. In the alternative, a press can be used to pre-form the shell piece 16, before the brick, tablet or wafer 29 is positioned therein.

The resulting arrangement, comprising shell piece 16 with brick (tablet or wafer) 29 therein would then be covered by shell piece 15, and perimeter sealed, for example by ultrasonic welding or heat sealing.

In general, it is foreseen that the mold or casting into which the brick 29 and shell piece 16 are pressed, during assembly, will be used as a weld nest, during application of the cover sheet 15 and during the ultrasonic welding or heat sealing operation. This will facilitate convenient, rapid manufacture.

Disadvantages of handling flowable particulate material, during assembly of the filter construction, are thus avoided. Also, in some instances when preferred techniques such as those described hereinbelow are utilized for formation of the tablet or brick 29, the amount of adsorbent per unit volume can exceed the bulk density of the adsorbent in its free flowing state. As will be apparent from experimental results reported below, effective operation as a filter is accomplished in spite of the fact that a binder has been mixed with the adsorbent material and in spite of the fact that the adsorbent is formed into a brick, tablet or wafer (i.e., predetermined and not free flowing) form.

In general, in many instances it will be preferred to wash or clean the construction 10, before it is positioned within the computer disk drive. Any method which achieves a desired level of cleanliness in the product for the end use, is usable. This will generally be based on the preferences of the particular manufacturer, for example disk drive manufacturer, involved. In general it is foreseen that conventional techniques involving ultrasonic washes with deionized water and various detergents will be desirable. Multi-stage washing and variations depending on the particular level of contaminant control desired for any given application, are feasible when the preferred materials described herein are used. Such washing techniques should have no negative effect on the operation of the construction 10 as the adsorbent filter, especially when the construction 10 is prepared from the preferred materials described below.

III. Usable and Preferred Materials

A. The Pouch or Encapsulating Material

In general, the material used to form the pouch, cover or encapsulating construction is preferably sufficiently porous to allow movement of air, water vapor and, if appropriate, organic vapor therethrough, freely, while at the same time appropriately enclosing the adsorbent construction. Preferred physical specifications for the pouch, cover or encapsulating material are:

Thickness range: 0.0005–0.050 inches

MVTR (Moisture Vapor 950 g/m$^2$/24 Hour Minimum per Transmission Rate): ASTM E96 Wet Cup Method Particle Efficiency: 99.99% Minimum on 0.3 micron at 10.5 fpm Pore Diameter: 0.1–2.0 micron It is also preferred that the material be relatively strong, resistant to tear or break, inexpensive, and readily available. Preferred materials comprise expanded, porous, polytetrafluoroethylene (PTFE) materials. The PTFE may be obtained from a variety of suppliers, or manufactured using known techniques. Usable PTFE is available from Tetratec, a division of Donaldson Company, Inc. of Bloomington, Minn.; and, from W. L. Gore & Associates, Inc., of Newark, Del. Preferably it is obtained in a form laminated to a spun bond polypropylene or similar material to facilitate heat bonding or ultrasonic welding.

Expanded porous polytetrafluoroethylene made according to the procedures described in U.S. Pat. Nos. 4,110,392; 4,187,390; and, 3,953,566 may be used. However, alternate materials are usable, as long as the general physical requirements are met. The three identified patents are incorporated herein by reference.

For the particular construction shown in FIGS. 1–3, it is necessary that the material provide a perimeter seal. It is preferred, then, that the porous PTFE material be provided in a form such that it can be sealed to itself, to form the perimeter seal or weld. A preferred technique for accomplishing this, is to apply to the PTFE material, on the side to be sealed, a layer of a thermoplastic polymer (for example a polyolefin such as a polypropylene). A fibrous material such as a spun bond scrim can be used. Such a material will not substantially modify the porosity characteristics of the construction 12, but will provide for an overall construction that can be sealed to itself, where the polypropylene is present. That is, the thermoplastic polymer side of the sheet or laminate construction can be sealed to itself, using ultrasonic welding techniques, for example. From PTFE suppliers such as those identified, a suitable film comprising PTFE laminated to a spun bond polypropylene scrim is generally available.

For typical arrangements used with computer disk drives, a variety of geometric configurations may be desirable. Generally, rectangular wafers or bricks will be preferred (i.e., square or rectangular when viewed in the plane view toward any side).

In general it will be preferred that the materials used for the construction 10 not contain detectable levels (by conventional NVR/FTIR analysis) of silicones, amides or DOP (dioctyl phthalate). It is also preferred that there be no detectable offgassing of hydrocarbons and other harmful contaminants to a disk drive, as determined by headspace GC/MS @ 105° C. for 24 hours. The characterized polytetrafluoroethylene materials, with polypropylene scrim applied thereto for sealing, provide for this. It is noted that these latter requirements are desirable for the overall construction, and thus apply to the material positioned within the pouch, casing or shell construction as well. The preferred materials defined in the next section meet these requirements.

Herein the term "NVR" refers to nonvolatile residue analysis, and the term "FTIR" refers to conventional fourier transform infrared analyses. The term "GC/MS" refers to gas chromatography/mass spectrometry, using conventional techniques.

B. The Adsorbent Brick, Tablet or Wafer

The adsorbent brick, tablet or wafer, enclosed within the pouch, is preferably the result of compression molding or otherwise forming a mixture of flowable, granular powder material and binder, into a molded, stable, wafer, brick or tablet. That is, sufficient binder is used to retain the compression molded particulate adsorbent construction in a non-free flowing form. By the term "non-free flowing" in this context, it is meant that the individual particles or granules from which the construction (brick, tablet or wafer) is formed are sufficiently bound that they do not separate during normal handling. As indicated above, the composition, prior to compression molding, may include any of a variety of selected adsorbents (or mixture) for the vapor control desired; i.e., moisture vapor, organic vapor, and/or acid gas vapor control.

For typical operation, a material which is stable and adsorbs within a temperature range of −40° C. to 100° C. will be preferred. Preferably powdered (passes through 100 mesh U.S.S.) or granular (28–200 mesh) adsorbent is used. A nominal (average) particle size of about greater than 7 microns is typical and desirable. Examples of usable materials are identified in the materials table below.

Generally preferred binders are, prior to application, dry, powdered or granular binders, which can be readily mixed with the adsorbent. As indicated below, in certain preferred operations, the solid, powdered or granular, binder and the adsorbent are mixed together, in the presence of liquid temporary binder to facilitate coating, and then are dried. It is preferred to avoid a binder material which will tend to completely coat the adsorbent, blocking it from effective operation in the overall assembly. Preferred binder materials are listed in the table of preferred materials below.

Preferably the composition of the tablet, brick or wafer comprises approximately 50–98%, by weight, adsorbent (more preferably a majority, for example 75–95%, most preferably approximately 80%); and, about 2–50%, by weight, binder (more preferably a minority, for example 5–25%, most preferably approximately 20% ). In some instances, it may be desirable to include a small amount of lubricant such as PTFE (Teflon® powder) within the composition, in order to facilitate mold release. When such is used, preferably no more than about 10%, and more preferably less than about 3% of the composition, comprises added lubricant. If a lubricant is used, preferably a minimum amount effective to accomplish a desirably reproducible mold release, is used.

The brick, wafer or tablet can be formed using a variety of compression molding or tablet-forming techniques. Generally all that is required is sufficient pressure and/or heat to ensure brick integrity under ordinary handling and manufacturing conditions. A compression such that a given volume contains about 0.8–1.75 times (preferably 1 to 1.75 times, most preferably greater than 1 time), by weight, adsorbent by comparison to the amount of adsorbent that would occupy the same volume if it were left in a granular, free-flowing state, is generally adequate and desirable. To accomplish this, such techniques as conventional tabletting are readily adaptable. Generally tabletting pressures on the order of 12,700 to 25,500 psi will suffice. It may be possible to use lower pressures by optimizing the formulation, or modifying the binder, for any selected application and geometry.

When the solids primarily (i.e., >70% by wt.) comprise silica gel for operation as a desiccant (i.e., water adsorption), generally a minimum effective bulk density of at least 0.61 g/cc (grams/cubic centimeter) after molding is desirable. Preferably sufficient compression occurs to get a density greater than 0.85 g/cc, and preferably about 0.92 g/cc.

Preferably the material is molded so that the resulting predetermined shape has no dimension which is less than 0.20 cm, and more preferably has no dimension which is less than about 0.51 cm. This will help ensure structural stability to the compression molded item. Preferably, for typical uses in electronic components, an overall bulk volume for the compression molded item within the range of about 0.008 to 262 cm$^3$ will be preferred, more typically 0.26 to 18 cm$^3$. In this context, the term "bulk volume" is meant to refer to the volume calculated from either the compression mold cell or the outside dimensions to the resulting compression molded product. For a typical disk drive filter, a "brick" approximately 3.1 cm long, and approximately 0.6 cm thick in one dimension and approximately 0.5 cm thick in the other (the product having flat sides) is usable.

In the following paragraphs, a usable technique for manufacturing the brick, wafer or tablet is provided. From this method, a variety of general applications will be apparent. In the method description the "% by weight" figures are based upon total weight of dry materials in the final brick, wafer or tablet 29 (FIG. 3). The wt. of any later applied cover is not included in this description.

First, a dry mixture would be prepared comprising 63% by weight silica gel (28–200 mesh silica gel) with about 10.5% polyvinyl alcohol powder (PVA, Air Products' Air Vault 203S). These materials would be mixed with water or another liquid, with 1 part of water for every 2 parts silica gel, and then are air dried. The water acts as a temporary processing binder and helps to enhance the coating of the binder over the silica gel.

The dry material would be screened with a 30-mesh screen to reduce lumps. To this would be added about 24% microcrystalline cellulose (MCC, FMC Lattice NT-050 or NT-105). To the mixture would also be added 2.5% Teflon® powder (DuPont Zonyl MP-1100) as lubricant.

The tablet would then be formed by using a conventional tabletting machine at pressures of 12,700–25,500 psi.

Typical tablet sizes would be as follows:

Length: 0.38 cm-10.16 cm

Width: 0.38 cm-10.16 cm

Thickness: 0.38 cm-2.54 cm

Using a water soluble PVA formulation has a variety of advantages. For example, the mix is free flowing which allows for high speed tablet making. Also, PVA powder mixes well with silica gel. The composition of PVA powder is acceptable for disk drive applications. That is it does not release volatiles that are undesirable within disk drives. The method described above is advantageous in part because it avoids the use of alcohol solvents. As a result, less contamination to electronic equipment is likely.

In Table I below, some usable materials for the tablet are identified.

TABLE I

USABLE MATERIALS FOR TABLET

| Component | Function | Supplier(s) and Sample Products |
| --- | --- | --- |
| Silica Gel | Water Vapor Adsorption | Grace Davison (Grade 11 or Syloid 63) Baltimore, MD 21203–2117; Fuji Sylisia (Type A or Type B) Portland, OR 97204 |
| Activated Carbon | Adsorption of organic vapors, hydrocarbons and/or acid gasses | Barnebey and Sutcliffe (209C; 209C KINA) Columbus, OH 43216 |
| Microcrystalline Cellulose | Binder | FMC (Lattice NT-050 or NT-006) Philadelphia, PA 19103 |
| Teflon Powder | Lubricant | DuPont (Zonyl MP 1100) Wilmington, DE 19805 |
| Polyvinyl Alcohol | Binder | Air Products (Airvol 203S) Allentown, PA |
| Starch | Binder | ADM (Clineo 718) Clinton, IA |
| Carboxyl Methyl Cellulose | Binder | Hercules (Aqualon 7MX) Wilmington, DE 19894 |
| Polyvinylpyrrolidone | Binder | GAF Chemicals Corporation (Plasdone) Wayne, NJ 07470 |
| Dicalcium Phosphate Dihydrate | Binder | Rhone Poulenc (DI-TRB) Shelton, CT |

EXPERIMENTAL

Objective

The objective of this study was to compare the adsorption characteristics of Silica Gel Tablets according to the invention with the present Adsorbent Pouches (using loose granular silica gel) supplied in the past by Donaldson Company, Inc. (the assignee of the present invention) to the disk drive industry.

Procedure

The tablets were formed using a process as generally described above and detailed further below. The tabletting pressure was approximately 25,000 using a hand tabletting. The following samples were included in this study:

| Part Number | Description |
| --- | --- |
| 11 80/20 (A) | Tablet with 80% Davison Grade 11 Silica Gel by Weight; 20% Lattice 006 Microcrystalline Cellulose (MCC); 3 tablets per weighing pan; each was 7 mm (millimeters) dia., 2.7 mm thick |
| 63 80/20 (B) | Tablet with 80% Davison Syloid 63 Silica Gel by Weight; 20% Lattice 006 MCC; 3 samples per weighing pan; each was 7 mm dia., 1.8 mm thick |
| 11 70/30 (C) | Tablet with 70% Davison Grade 11 Silica Gel by Weight; 30% Lattice 006 (MCC); 3 tablets per weighing pan; each was 7 mm dia., 2.7 mm thick |
| 63 70/30 (D) | Tablet with 70% Davison Syloid 63 Silica Gel by Weight; 30% Lattice 006 (MCC); 3 tablets per weighing pan; each 7 mm dia., 1.8 mm thick |

| Part Number | Description |
|---|---|
| 63 50/50 (E) | Tablet with 50% Davison Syloid 63 Silica Gel by Weight) 50% Lattice 006 (MCC); 2 tablets per weighing pan; each 7 mm dia., 1.8 mm thick |
| P53-7365 (F) | Present Adsorbent Pouch Supplied to the Disk Drive Industry by Donaldson Company, Inc. as Part P53-7365 (Baseline); 1 sample per weighing pan; pouch length 29 mm, pouch width 12.7 mm, pouch thickness 6.4 mm. |

A sample (called "11 PVA" or "G") was also made comprising: 63%, by wt., Davison Grade 11 silica gel; 10.5% Air Products' Airvol 203S PVA; 24% Lattice NT-050 MCC; and 2.5% DuPont Zonyl MP-1100 Teflon powder. Its diameter was 12.7 mm and it had a thickness of 0.28 mm. Only one tablet of this was used, per weighing pan.

Davison Grade 11 is a 28–200 mesh silica gel, while Davison Syloid 63 is a 7 micron powder form of silica gel. All samples were run in duplicate except P/N 63 50/50 (E) which had a limited sample availability. Thus, data A1 and A2 are for the two runs of material A, etc.

Sample Preparation

Each tablet using MCC only was prepared by weighing out the raw material ratios as called for above. The samples were then formed into tablets on a hand tablet press. The pressure applied during tablet forming was approximately 25,000 psi for MCC.

For tablets using a mixture of MCC, PVA, and Teflon, the following procedure was used for tablet forming:

1) Mix 6 parts Davison Grade 11 Silica Gel with 1 part Air Products Airvol 203S PVA.
2) Take the mixture from (1) and add 1 part of water for every 2 parts of silica gel.
3) Air dry the mixture.
4) Screen the mixture with a 30 mesh screen to reduce lumps.
5) Add and mix FMC Lattice NT-050 MCC such that the final mixture will contain 24% MCC by weight.
6) Add and mix DuPont Zonyl MP-1100 Teflon Powder such that the final mixture will contain 2.5% by weight.
7) Form tablets using 17,800 to 25,500 psi on a hand tablet press.

The following procedure was used for this analysis:

1) Each sample (1,2 or 3 tablets as indicated above) was placed into a labeled aluminum pan for identification purposes. The P53-7365 baseline was tested as supplied with a PTFE outer cover. The other samples were tested without encapsulating covers.
2) The samples were dried at 105° C. for 15 hours.
3) The samples were removed from the oven, individually sealed in vapor barrier packaging and allowed to cool to ambient conditions.
4) A Tenney temperature and humidity chamber was programmed to maintain 50% RH (Relative Humidity) and 21.1° C. and allowed to equilibrate.
5) Each sample was then removed from its vapor barrier package and weighed. This weight was recorded as the dry weight. Ambient exposure time was minimized to ensure accurate dry weights.
6) The samples were then placed into the temperature and humidity chamber and the time was recorded as the start time.
7) Each individual sample was removed from the chamber and weighed periodically. The time was recorded for each weight measurement. Ambient exposure time was minimized to ensure meaningful weight measurements.
8) Weight measurements were taken for each part until equilibrium was reached.
9) The weight of adsorbent was determined for each part based upon the formulation and the dry weight or direct measurement.

Again, for some samples, as indicated in the table above, 2 or 3 individual tablets made up the sample.

Data Analysis/Background

The weights were compiled as a function of time for each sample. The dry weights were subtracted from each measurement with the difference assumed to be water vapor adsorption. The mass of water vapor adsorbed was calculated as a function of time for each sample and then normalized per mass of dry silica gel and adsorbent volume. The normalized adsorption curves were then graphed as a function of time to infer adsorbent performance. The graphs allow a direct comparison between the silica gel tablets and the P53-7365 (F1 and F2) baseline. The data collected, for all but 11 PVA or G, is found in Tables II, III and IV below.

TABLE II

Raw Data (Sample wt. (Gram))

| Sample name | Sample # | | | | | | |
|---|---|---|---|---|---|---|---|
| | time(mins) | | 0 | 30 | 63 | 96 | 131 |
| 11 80/20 (1) | A1 | 1.3947 | 1.3246 | 1.3460 | 1.3622 | 1.3725 | 1.3799 |
| 11 80/20 (2) | A2 | 1.4134 | 1.3406 | 1.3656 | 1.3788 | 1.3903 | 1.399 |
| 63 80/20 (1) | B1 | 1.2702 | 1.2252 | 1.2416 | 1.254 | 1.262 | 1.2666 |
| 63 80/20 (2) | B2 | 1.4999 | 1.4704 | 1.4818 | 1.4882 | 1.4948 | 1.4979 |
| 11 70/30 (1) | C1 | 1.7172 | 1.6509 | 1.6686 | 1.6858 | 1.6981 | 1.7049 |
| 11 70/30 (2) | C2 | 1.717 | 1.6508 | 1.6704 | 1.6864 | 1.6941 | 1.7047 |
| 63 70/30 (1) | D1 | 1.5754 | 1.5338 | 1.5505 | 1.56 | 1.5657 | 1.5705 |
| 63 70/30 (2) | D2 | 1.4895 | 1.4628 | 1.4732 | 1.4797 | 1.4837 | 1.4870 |
| 83 50/50 (1) | E | 1.5147 | 1.4935 | 1.5007 | 1.5065 | 1.5093 | 1.5115 |
| P537365 Baseline (1) | F1 | 2.4229 | 2.2749 | 2.2997 | 2.325 | 2.3444 | 2.3628 |
| P537365 Baseline (2) | F2 | 2.4507 | 2.2992 | 2.323 | 2.3509 | 2.3687 | 2.3922 |

| Sample # | 184 | 194 | 224 | 255 | 285 | 316 |
|---|---|---|---|---|---|---|
| A1 | 1.3849 | 1.3894 | 1.3921 | 1.3936 | 1.3936 | 1.3951 |
| A2 | 1.4037 | 1.408 | 1.4115 | 1.4121 | 1.4117 | 1.4124 |
| B1 | 1.2677 | 1.2689 | 1.2704 | 1.2702 | 1.2693 | 1.2699 |
| B2 | 1.4985 | 1.4992 | 1.4997 | 1.4997 | 1.4994 | 1.4999 |
| C1 | 1.7086 | 1.7126 | 1.7154 | 1.7157 | 1.7156 | 1.716 |
| C2 | 1.7087 | 1.712 | 1.7153 | 1.716 | 1.7154 | 1.7165 |
| D1 | 1.5720 | 1.5740 | 1.5753 | 1.5751 | 1.5745 | 1.5747 |
| D2 | 1.4883 | 1.4892 | 1.490 | 1.4898 | 1.4893 | 1.4896 |
| E | 1.513 | 1.5139 | 1.5145 | 1.515 | 1.5145 | 1.5144 |
| F1 | 2.3762 | 2.3895 | 2.4008 | 2.4081 | 2.4122 | 2.4156 |
| F2 | 2.4037 | 2.4137 | 2.4272 | 2.4328 | 2.4356 | 2.4421 |

| time(mins) | 346 | 377 | 1244 | 1274 | 1305 | 1364 |
|---|---|---|---|---|---|---|
| A1 | | 1.394 | 1.3988 | 1.3978 | 1.3973 | 1.3982 |
| A2 | | 1.4139 | 1.4192 | 1.418 | 1.4176 | 1.4181 |
| B1 | | 1.2698 | 1.2715 | 1.2708 | 1.2704 | 1.2716 |
| B2 | | 1.4994 | 1.5002 | 1.4997 | 1.4996 | 1.5000 |
| C1 | | 1.717 | 1.7211 | 1.7203 | 1.7199 | 1.7208 |
| C2 | | 1.7169 | 1.7219 | 1.7205 | 1.7203 | 1.7209 |
| D1 | | 1.5751 | 1.5761 | 1.5753 | 1.5754 | 1.5759 |
| D2 | | 1.4897 | 1.4908 | 1.4899 | 1.4900 | 1.4905 |
| E | | 1.5146 | 1.5155 | 1.5149 | 1.5149 | 1.5151 |
| F1 | | 2.4302 | 2.4813 | 2.4749 | 2.4767 | 2.4795 |
| F2 | | 2.4563 | 2.5064 | 2.5053 | 2.5046 | 2.5064 |

TABLE III

| Sample name | Sample # time(mins) | 0 | 30 | 63 | 96 | 131 | 164 | 194 | 224 | 255 | 285 | 316 |
|---|---|---|---|---|---|---|---|---|---|---|---|---|
| 11 80/20 (1) | A1 | 0 | 0.0214 | 0.0376 | 0.0479 | 0.0553 | 0.0603 | 0.0648 | 0.0675 | 0.069 | 0.069 | 0.0705 |
| 11 80/20 (2) | A2 | 0 | 0.0250 | 0.0382 | 0.0497 | 0.0584 | 0.0631 | 0.0674 | 0.0709 | 0.0715 | 0.0711 | 0.0718 |
| 63 80/20 (1) | B1 | 0 | 0.0164 | 0.0288 | 0.0368 | 0.0414 | 0.0425 | 0.0437 | 0.0452 | 0.045 | 0.0441 | 0.0447 |
| 63 80/20 (2) | B2 | 0 | 0.0114 | 0.0178 | 0.0244 | 0.0275 | 0.0281 | 0.0288 | 0.0293 | 0.0293 | 0.029 | 0.0295 |
| 11 70/30 (1) | C1 | 0 | 0.0177 | 0.0349 | 0.0472 | 0.054 | 0.0577 | 0.0617 | 0.0645 | 0.0648 | 0.0647 | 0.0651 |
| 11 70/30 (2) | C2 | 0 | 0.0196 | 0.0356 | 0.0433 | 0.0539 | 0.0579 | 0.0612 | 0.0645 | 0.0652 | 0.0646 | 0.0657 |
| 63 70/30 (1) | D1 | 0 | 0.0167 | 0.0262 | 0.0319 | 0.0367 | 0.0382 | 0.0402 | 0.0415 | 0.0413 | 0.0407 | 0.0409 |
| 63 70/30 (2) | D2 | 0 | 0.0104 | 0.0169 | 0.0209 | 0.0242 | 0.0255 | 0.0264 | 0.0272 | 0.027 | 0.0265 | 0.0268 |
| 63 50/50 (1) | E | 0 | 0.0072 | 0.0130 | 0.0158 | 0.018 | 0.0195 | 0.0204 | 0.021 | 0.0215 | 0.021 | 0.0209 |
| P537365 Baseline (1) | F1 | 0 | 0.0248 | 0.0501 | 0.0695 | 0.0879 | 0.1013 | 0.1146 | 0.1259 | 0.1332 | 0.1373 | 0.1407 |
| P537365 Baseline (2) | F2 | 0 | 0.0238 | 0.0517 | 0.0695 | 0.093 | 0.1045 | 0.1145 | 0.128 | 0.1336 | 0.1364 | 0.1429 |

| time(mins) | 346 | 377 | 1244 | 1274 | 1305 | 1364 |
|---|---|---|---|---|---|---|
| A1 | 0.0701 | 0.0694 | 0.0742 | 0.0732 | 0.0727 | 0.0736 |
| A2 | 0.0728 | 0.0733 | 0.0786 | 0.0774 | 0.077 | 0.0775 |
| B1 | 0.045 | 0.0446 | 0.0463 | 0.0456 | 0.0452 | 0.0464 |
| B2 | 0.0295 | 0.029 | 0.0298 | 0.0293 | 0.0292 | 0.0296 |
| C1 | 0.0663 | 0.0661 | 0.0702 | 0.0694 | 0.069 | 0.0699 |
| C2 | 0.0662 | 0.0661 | 0.0711 | 0.0697 | 0.0695 | 0.0701 |
| D1 | 0.0416 | 0.0413 | 0.0423 | 0.0415 | 0.0416 | 0.0421 |
| D2 | 0.0267 | 0.0269 | 0.028 | 0.0271 | 0.0272 | 0.0277 |
| E | 0.0212 | 0.0211 | 0.022 | 0.0214 | 0.0214 | 0.0216 |
| F1 | 0.148 | 0.1553 | 0.2064 | 0.2 | 0.2018 | 0.2046 |
| F2 | 0.1515 | 0.1571 | 0.2072 | 0.2061 | 0.2054 | 0.2072 |

TABLE IV

Volume Calculation

| Sample name | Sample # | # Tablets | Diam (in) | radius (in) | height (in) | volume (in³) |
|---|---|---|---|---|---|---|
| 11 80/20 (1) | A1 | 3 | 0.284 | 0.142 | 0.106 | 0.0201 |
| 11 80/20 (2) | A2 | 3 | 0.289 | 0.1445 | 0.109 | 0.0214 |
| 63 80/20 (1) | B1 | 3 | 0.288 | 0.144 | 0.072 | 0.0141 |
| 83 80/20 (2) | B2 | 2 | 0.287 | 0.1435 | 0.07 | 0.0091 |
| 11 70/30 (1) | C1 | 3 | 0.289 | 0.1445 | 0.105 | 0.0207 |
| 11 70/30 (2) | C2 | 3 | 0.289 | 0.1445 | 0.107 | 0.0210 |
| 63 70/30 (1) | D1 | 3 | 0.291 | 0.1455 | 0.071 | 0.0142 |
| 63 70/30 (2) | D2 | 2 | 0.289 | 0.1445 | 0.07 | 0.0092 |
| 63 50/50 (1) | E | 2 | 0.287 | 0.1435 | 0.07 | 0.0091 |
| P537365 Baseline (1) | F1 | | 0.4335 | 0.2445 | 1.0775 | 0.0835 |
| P537365 Baseline (2) | F2 | | 0.4365 | 0.261 | 1.0775 | 0.0909 |

Results/Discussion

Figure 5:
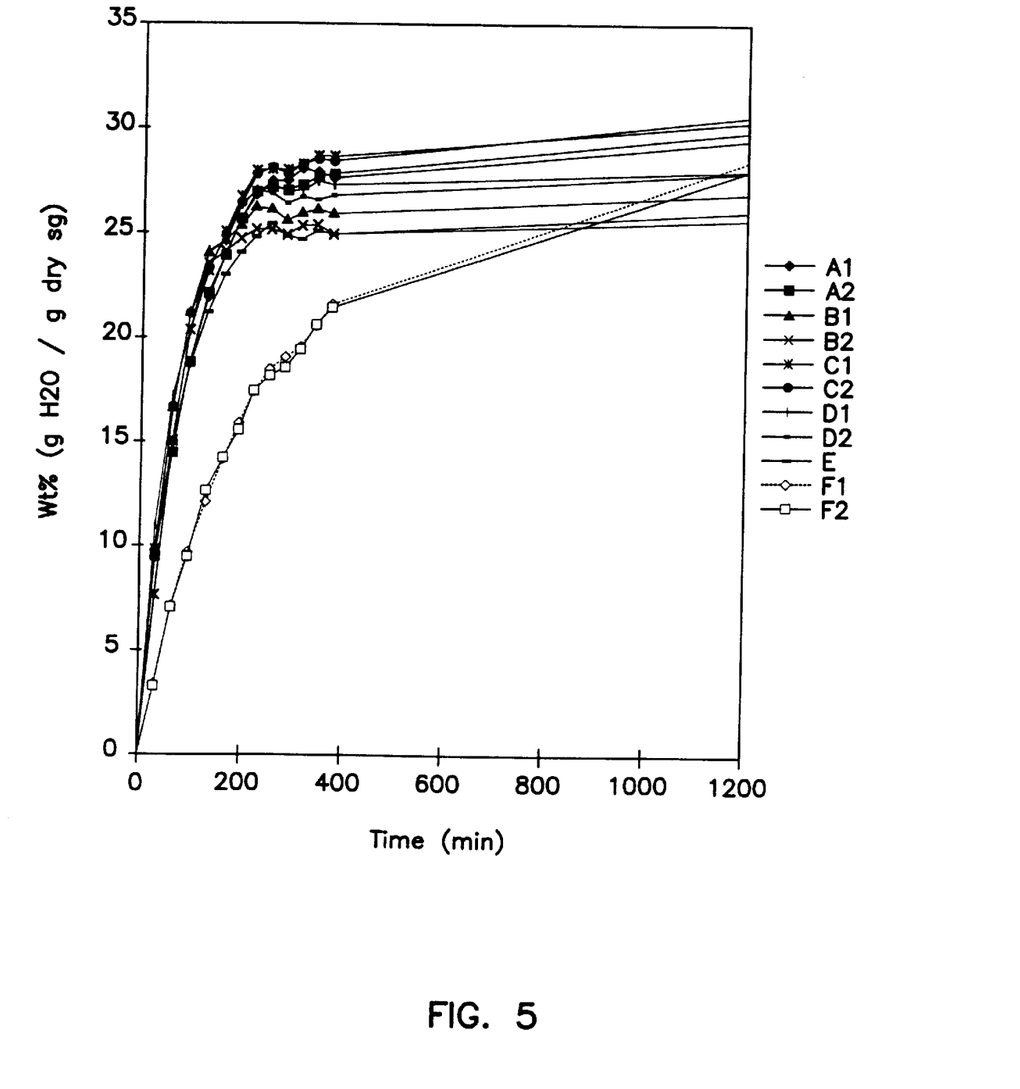
FIG. 5 is a first graph presenting data described in the Experimental section; and, FIG. 6 is a second graph presenting data described in the Experimental section.

FIG. 5 shows the rate of water vapor adsorption for each sample normalized per mass of dry silica gel. As shown in FIG. 5, the rate of adsorption for the silica gel tablets is greater than that of the P53-7365 (F1 and F2) baseline. The final capacity of each sample normalized per mass of dry silica gel ranges from 25–30%. The range is likely a result of variability in the mixture of silica gel to binder for each sample. Silica gel in bulk form would be expected to adsorb approximately 28.75% of its weight at the conditions specified. Therefore, the tablet process does not negatively affect the water vapor adsorption of the silica gel.

Figure 6:
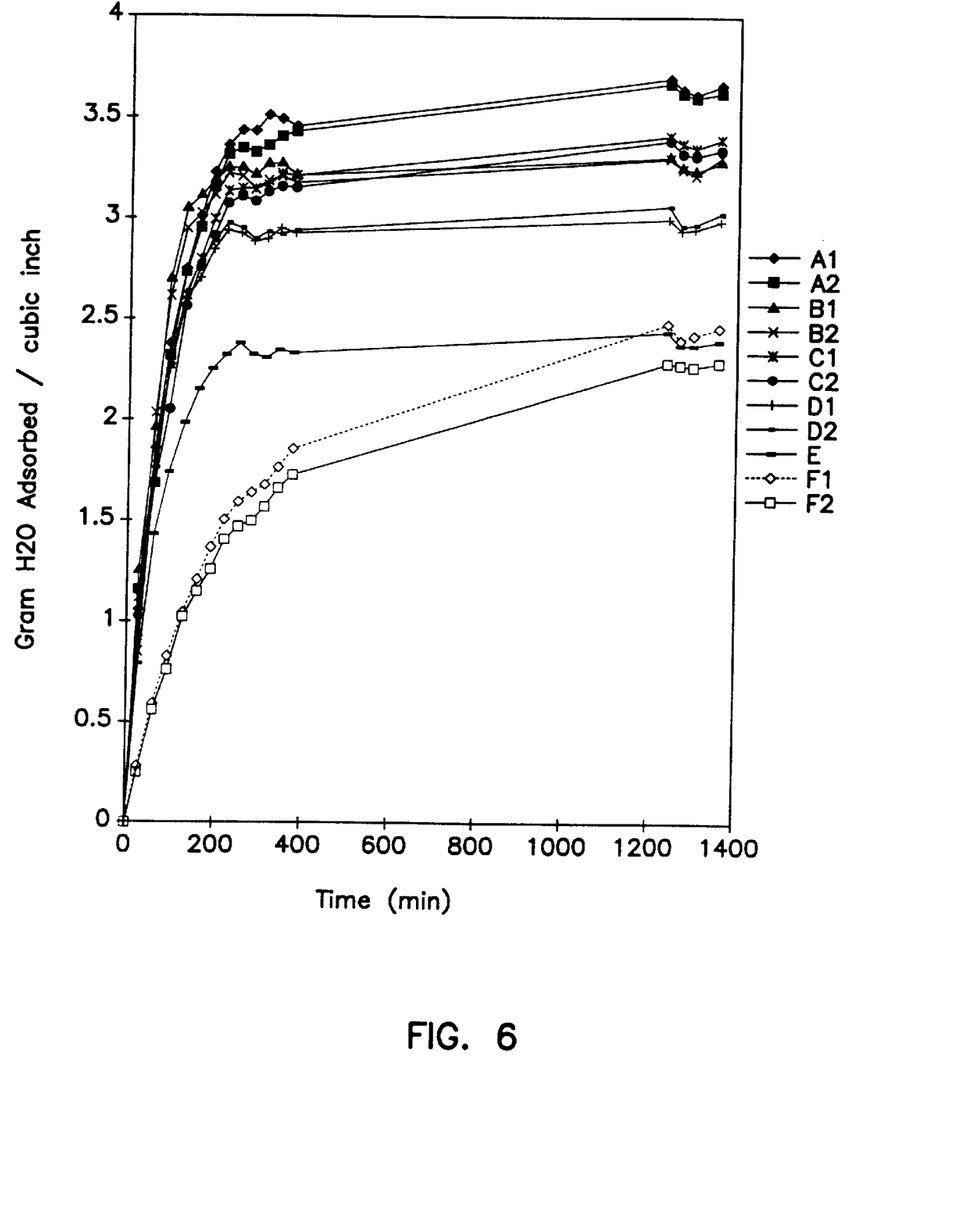

FIG. 6 outlines the water vapor adsorption normalized per unit volume. As shown in FIG. 6, the silica gel tablets outperform the P53-7365 (F1 and F2) baseline in terms of capacity per unit volume. This characteristic is especially useful in Disk Drive applications where available space is limited. As expected, the silica gel tablets with a higher silica gel content exhibited a higher capacity for water vapor per unit volume. The Grade 11 and Syloid 63 silica gel materials appear to have similar adsorption performance in Tablet form.

Conclusions

The following conclusions can be drawn from the above results:

1) The silica gel tablets had an improved rate of adsorption when compared to the granular silica gel pouch baseline at the conditions tested.
2) The silica gel tablets had much improved capacity for water vapor per unit volume when compared to the granular silica gel pouch baseline at the conditions tested.
3) The capacity of the silica gel for water vapor is unaffected when in tablet form at the conditions tested.
4) There was an insignificant difference in adsorption characteristics between the Davison Grade 11 and Syloid 63 silica gel materials in tablet form at the conditions tested.

Sample 11 PVA or G was compared to P53-7365 baseline. In general, the rate of adsorption for the silicate gel tablet (sample 11 PVA) was greater than the P53-7365 baseline. However the difference in the rate of adsorption for this experiment, as for the other experiments reported above, may have been a result of the fact that the baseline (P53-7365) had a PTFE cover and a different geometry, which could have resulted in a lower surface area to adsorbent mass ratio. In general, the 11 PVA sample, i.e., sample G, adsorbed a greater weight of $H_2O$, per gram of dry silica gel contained therein. It also adsorbed a greater amount of water per unit volume.

The raw data for this later experiment is reported in Tables V, VI, VII below. Table V shows change of weight, at the time increments. Table VI gives sample specifications concerning masses of silica gel and volume of silica gel in the samples, as well as the pouch weight for the samples which had a pouch. Table VII shows the amount of water vapor adsorbed, at the time intervals.

TABLE V

Raw Data

| Description | wt0 | wt1 | wt2 | wt3 | wt4 | wt5 | wt6 | wt7 | wt8 | wt9 |
|---|---|---|---|---|---|---|---|---|---|---|
| P537365 (F) | 0.985 | 1.034 | 1.065 | 1.083 | 1.101 | 1.112 | 1.128 | 1.134 | 1.140 | 1.164 |
| P537365 (F) | 1.021 | 1.074 | 1.101 | 1.125 | 1.139 | 1.152 | 1.163 | 1.171 | 1.179 | 1.201 |
| 11 PVA (G1) | 2.423 | 2.507 | 2.541 | 2.565 | 2.588 | 2.598 | 2.608 | 2.615 | 2.627 | 2.641 |
| 11 PVA (G2) | 2.466 | 2.542 | 2.575 | 2.599 | 2.616 | 2.628 | 2.64 | 2.649 | 2.657 | 2.679 |
| Time | 0 | 30 | 60 | 90 | 120 | 150 | 185 | 215 | 255 | 1030 |

TABLE VI

Sample Specifications

| Sample | Pouch weight | mSG (g) | vSG (cubic inches) |
|---|---|---|---|
| P537365 (F) | 0.236 | 0.699 | 0.0699 |
| P537365 (F) | 0.241 | 0.730 | 0.0730 |
| 11 PVA (G1) | | 0.7008 | 0.0699 |
| 11 PVA (G2) | | 0.7176 | 0.0699 |

TABLE VII

| Sample Time | 0 | 30 | 60 | 90 | 120 | 150 | 185 | 215 | 255 | 1030 |
|---|---|---|---|---|---|---|---|---|---|---|
| | | | | Water Vapor Adsorbed | | | | | | |
| P537365 (F) | 0.00 | 7.01 | 11.44 | 14.02 | 16.60 | 18.17 | 20.46 | 21.32 | 22.17 | 25.61 |
| P537365 (F) | 0.00 | 7.26 | 10.96 | 14.25 | 16.16 | 17.95 | 19.45 | 20.55 | 21.64 | 24.66 |
| 11 PVA (G1) | 0.00 | 11.99 | 16.84 | 20.26 | 23.54 | 24.97 | 26.40 | 27.40 | 29.11 | 31.11 |
| 11 PVA (G2) | 0.00 | 10.59 | 15.19 | 18.53 | 20.90 | 22.58 | 24.25 | 25.50 | 26.62 | 29.68 |

We claim:

1. A combination comprising:
   (a) a housing defining an internal volume including therein a computer disk drive to be protected; and,
   (b) an adsorbent filter positioned within the housing internal volume; the adsorbent filter comprising a non-free flowing, compression molded particulate adsorbent and an outer, porous, adsorbent cover positioned around the non-free flowing, compression molded particulate adsorbent.

2. The combination of claim 1, wherein the non-free flowing, compression molded particulate adsorbent comprises the result of compression molding a mixture of particulate adsorbent and binder.

3. The combination of claim 2, wherein the non-free flowing, compression molded particulate adsorbent comprises 75 to 95 wt.% particulate adsorbent and 5 to 25 wt.% binder.

4. The combination of claim 2, wherein the particulate adsorbent is selected from 1) powdered particulate adsorbent which goes through 100 mesh U.S.S.; 2) granular particulate adsorbent which is 28 to 200 mesh U.S.S.; and 3) mixtures thereof.

5. The combination of claim 2, wherein the binder is selected from polyvinyl alcohol, starch, carboxymethyl cellulose, polyvinyl pyrrolidone, microcrystalline cellulose, dicalcium phosphate dihydrate, and mixtures thereof.

6. The combination of claim 2, wherein the particulate adsorbent is selected from silica gel, activated carbon, molecular sieve, activated alumina, or mixtures thereof.

7. The combination of claim 2, wherein the particulate adsorbent comprises silica gel.

8. The combination of claim 2, wherein the non-free flowing, compression molded particulate adsorbent has a density that is greater than the density of the particulate adsorbent before compression molding.

9. The combination of claim 2, wherein the non-free flowing, compression molded particulate adsorbent results from the compression molding of the particulate adsorbent and the binder at a pressure of 12,700 to 25,500 psi.

10. The combination of claim 1, wherein the outer, porous, adsorbent cover comprises expanded, porous polytetrafluoroethylene.

11. The combination of claim 1, wherein the outer, porous, adsorbent cover comprises a two piece shell having a perimeter seal.

12. The combination of claim 1, wherein the outer, porous, adsorbent cover comprises polytetrafluoroethylene laminated to a scrim.

13. The combination of claim 1, wherein the non-free flowing, compression molded particulate adsorbent has a form of a brick, tablet, or wafer.

14. The combination of claim 1, wherein the non-free, flowing compression molded particulate adsorbent has no dimension that is less than 0.20 cm.

15. A combination comprising:
   (a) a housing defining an internal volume including therein a computer disk drive to be protected; and,
   (b) an adsorbent filter positioned within the housing internal volume; the adsorbent filter comprising:
      (i) an outer, porous, adsorbent cover comprising a two-piece shell having a perimeter seal; and
      (ii) a non-free flowing compression molded particulate adsorbent positioned within the two-piece shell, the compression molded particulate adsorbent comprising the result of compression molding a mixture including particulate adsorbent and binder.

16. A method of protecting a disk drive from a contaminant, the method comprising:
   positioning within the disk drive an adsorbent filter configured and arranged to adsorb at least a portion of the contaminant, the adsorbent filter comprising a compression molded particulate adsorbent and an outer, porous, adsorbent cover disposed around the compression molded particulate adsorbent.

17. The method of claim 16, wherein the contaminant comprises water vapor and the compression molded particulate adsorbent comprises a water adsorbent material.

18. The method of claim 17, wherein the water adsorbent material comprises silica gel.

19. The method of claim 16, wherein the outer, porous, adsorbent cover comprises a two piece shell having a perimeter seal.

20. A combination comprising:
   (a) a housing defining an internal volume including therein a disk drive to be protected; and
   (b) an adsorbent filter positioned within the housing internal volume, the filter comprising:
      (i) an outer shell; and
      (ii) a non-free flowing, compression molded particulate adsorbent disposed in the outer shell.

21. The combination of claim 20, wherein the outer shell of the adsorbent filter comprises a receptacle piece and a cover piece.

22. The combination of claim 21, wherein the cover piece is porous.

23. The combination of claim 21, wherein the cover piece comprises polytetrafluoroethylene.

24. The adsorbent filter of claim 20, wherein the outer shell allows movement of air therethrough.

25. The adsorbent filter of claim 20, wherein the non-free flowing, compression molded particulate adsorbent comprises the result of compression molding a mixture of particulate adsorbent and binder.

26. A method of protecting a disk drive from a contaminant, the method comprising:
   (a) providing an adsorbent filter configured and arranged to adsorb at least a portion of the contaminant, the adsorbent filter comprising an outer shell and a compression molded particulate adsorbent disposed in the outer shell;

(a) positioning the adsorbent filter within the disk drive; and (b) passing the contaminant through the adsorbent filter.

27. The method of claim 26, wherein the step of passing the contaminant comprises passing a contaminant comprising water vapor, and wherein the step of providing an adsorbent filter comprises providing a compression molded particulate adsorbent comprising a water adsorbent material.

28. The method of claim 26, wherein the step of providing an adsorbent filter comprises providing an adsorbent filter comprising an outer shell and a compression molded adsorbent disposed in the outer shell, the outer shell comprising a receptacle piece and a cover piece.

29. The method of claim 28, wherein the step of providing an adsorbent filter comprises providing an adsorbent filter comprising an outer shell comprising a porous cover piece.

30. The method of claim 28, wherein the step of providing an adsorbent filter comprises providing an adsorbent filter comprising an outer shell comprising polytetrafluoroethylene.

31. The method of claim 26, wherein the step of passing the contaminant through the adsorbent filter comprises passing air through the outer shell of the adsorbent filter.

* * * * *

UNITED STATES PATENT AND TRADEMARK OFFICE
CERTIFICATE OF CORRECTION

PATENT NO. : 6,143,058
DATED : November 7, 2000
INVENTOR(S) : Dahlgren et al.

It is certified that error appears in the above-identified patent and that said Letters Patent is hereby corrected as shown below:

Column 6,
Lines 54-55, "MVTR (Moisture Vapor 950 g/m$^2$/24 Hour Minimum per Transmission Rate): ASTM E96 Wet Cup Method" should read -- MVTR (Moisture Vapor Transmission Rate): 950 g/m$^2$/24 Hour Minimum per ASTM E96 Wet Cup Method --

Columns 13 and 14 (Table II),
Row 14, in the middle of the where it indicates table time(mins), "184" should read -- 164 --

Columns 17 and 18 (Table IV),
Row 4, the fourth sample, "83 80/20 (2)" should read -- 63 80/20 (2) --

Signed and Sealed this

Nineteenth Day of March, 2002

*Attest:*

*Attesting Officer*

JAMES E. ROGAN
*Director of the United States Patent and Trademark Office*